Sept. 19, 1967 J. J. WALKER 3,343,146
TRANSFLUXOR BINARY CIRCUITS
Filed Feb. 3, 1964
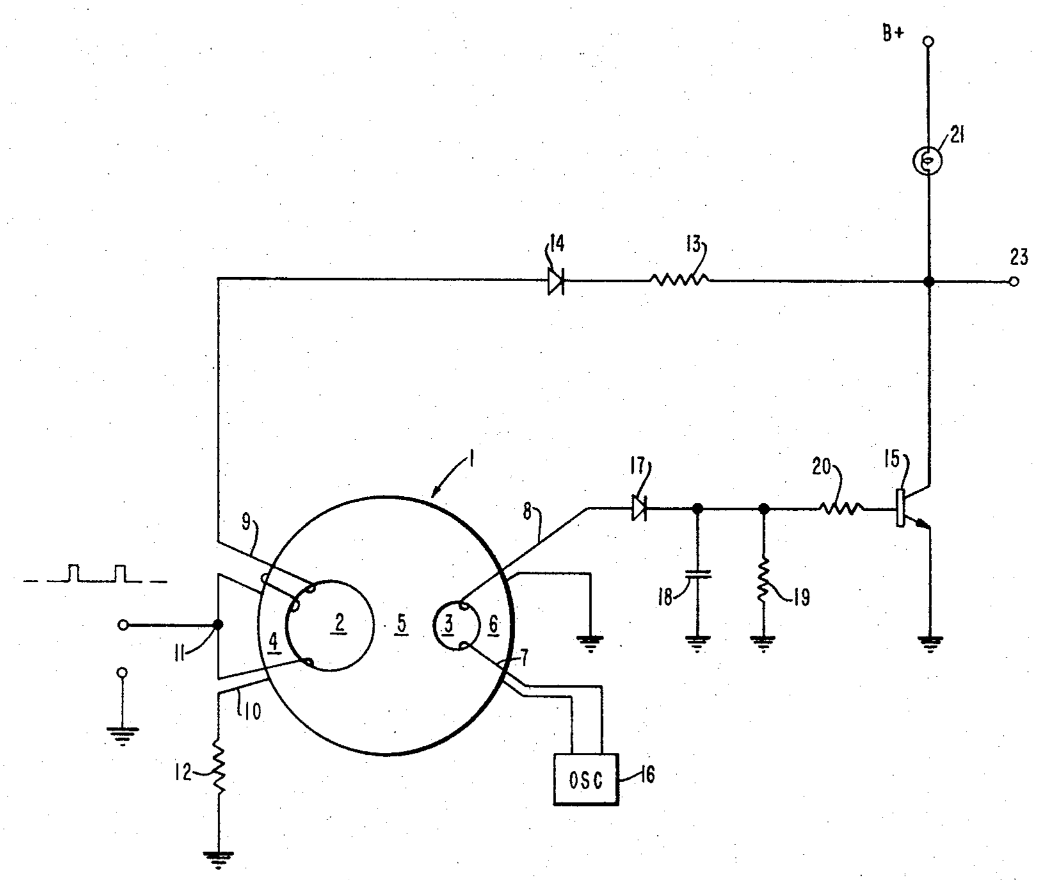
INVENTOR
James J. Walker
BY Stewart F. Moore
ATTORNEY 3,343,146

TRANSFLUXOR BINARY CIRCUITS

James J. Walker, Bronx, N.Y., assignor to American Machine & Foundry Company, a corporation of New Jersey Filed Feb. 3, 1964, Ser. No. 341,917
6 Claims. (Cl. 340—174)

This invention relates to binary circuits, and more particularly to binary circuits capable of retaining their memory during power failures or routine shutdown time.

In recent years, binary circuits have found considerable usefulness in computer systems as binary counting elements. The earlier binary circuits included a pair of vacuum tubes interconnected so that when one tube was conductive, the other tube of the pair would be biased into a non-conductive state. These binary circuits could then be connected so that the alternate one of the vacuum tubes became conductive upon application of each successive input pulse, and hence these circuits would perform a counting function. An inherent limitation of these circuits, and the subsequent transistor circuits which replaced them, is that these circuits lose their memory when the electrical power is removed either because of a power failure or a routine shutdown. In other words, when electrical power is again applied to a circuit, there is no way of telling whether the tube that then becomes conductive is the same tube which was conductive when the electrical power was previously removed. Thus, these binary circuits cannot be used in systems where it is necessary to continue the operation from where left off prior to the power failure or down time.

To overcome this inherent limitation, binary circuits have been designed including magnetic memory elements which are capable of retaining their memory even though the operating electrical power is removed. Circuits of this type include, for example, a pair of magnetic core elements which perform the memory function in combination with a pair of transistors which perform the switching function. The advent of the magnetic transfluxor, which is a device capable of performing both the memory and switching functions, brought about another type of circuit merely including an interconnected pair of transfluxors. Thereafter, additional binary circuits were developed employing transistors in combination with two or more transfluxors. These binary circuits including two or more magnetic elements have, however, been found too costly for many installations.

Thus, an object of this invention is to provide a relatively inexpensive binary circuit of the type which is capable of maintaining its memory during power failures and routine down time.

Another object is to provide a magnetic binary circuit requiring but one transfluxor in combination with a single transistor.

A transfluxor is a magnetic device including a multi-apertured core and a plurality of associated windings. These windings generally include a set and a blocking winding which, when energized, are capable of saturating selected areas of the core thereby placing the core in either the set or blocked state, respectively. A transfluxor also generally includes a primary winding and a secondary winding, which windings are inductively coupled via the core only while the core is in the set state. Thus, if an alternating signal is applied to the primary winding, a corresponding alternating signal is induced in the secondary winding provided the core is in the set state, and this induced signal can then be utilized to render a switching device, such as a transistor, conductive, thereby providing a usable output corresponding to the set state of the magnetic core.

In accordance with this invention, one of the set and blocking windings has a larger number of turns than the other. Thus, if the smaller winding alone is energized, it will have its normal effect on the core. If, on the other hand, both of the windings are simultaneously energized, the larger winding has the predominant effect on the core. An associated switching device is connected to the larger winding so that this larger winding is in condition for energization only when the switching device is conductive. Therefore, if the switching device is initially nonconductive when an input pulse is applied, the first input pulse energizes only the smaller winding to change the state of the core and thereby render the switching device conductive. Thereafter, when a second input pulse is applied, both of the windings are energized with the larger winding having the predominant effect, thereby returning the core to its initial state and rendering the switching device nonconductive. Thus, it can be seen that the core changes state upon the application of each successive input pulse, thereby achieving the prerequisite binary circuit operation. The magnetic core remains in either the set or blocked state when no electrical power is applied, and therefore, this binary circuit will retain its memory during power failures and routine down time.

The following specification, of which the accompanying drawing forms a part, explains the manner in which the foregoing objects are attained in accordance with this invention. The drawing is a schematic diagram illustrating a binary circuit including one transfluxor and one transistor interconnected to form a binary circuit in accordance with this invention.

The particular transfluxor illustrated in the drawing includes a circular magnetic core 1 of magnetic material having a substantially rectangular hysteresis loop. The core is provided with a main aperture 2 and a smaller coupling aperture 3, which apertures define the legs 4, 5 and 6 of the core. The core thus provides a first magnetic path which surrounds main aperture 2 and includes legs 4, 5 and 6. The core also provides a second magnetic path which surrounds coupling aperture 3 and includes only legs 5 and 6, so that legs 5 and 6 are common to both of the magnetic paths. A primary winding 7 and a secondary winding 8 are wound about leg 6 and pass through coupling aperture 3. The primary and secondary windings can be inductively coupled to one another by means of the magnetic path surrounding coupling aperture 3.

The transfluxor also includes a blocking winding 9 and a set winding 10, these windings being wound about leg 4 so that they pass through the main aperture. Blocking winding 9 preferably has a substantially larger number of turns than does set winding 10. Windings 9 and 10 are oriented so that, when energized, these windings produce magnetic fluxes through leg 4 in the opposite directions. One end of each of windings 9 and 10 are connected to a common junction 11. The other end of winding 10 is connected to ground via a resistor 12 and the other end of winding 9 is connectable to ground via the collector-emitter circuit of an NPN type transistor 15. More specifically, the other end of winding 9 is connected to the anode of a semiconductor diode 14, the cathode of diode 14 is connected to the collector of transistor 15 via a resistor 13, and the emitter of transistor 15 is connected to ground.

Positive input pulses are supplied to junction 11 via a suitable input terminal. If transistor 15 is conductive, both windings 9 and 10 are simultaneously energized by an applied input pulse. With the windings arranged as shown in the drawing, blocking winding 9 induces a counterclockwise flux surrounding main aperture 2 under these circumstances, and set winding 10 induces a clockwise flux surrounding the main aperture. The relative number of turns of windings 9 and 10, and the relative sizes of resistors 12 and 13, are selected so that if an input pulse is applied when transistor 15 is conductive, the flux created by winding 9 not only overcomes that flux created by set winding 10, but also is of sufficient magnitude to saturate legs 5 and 6. The flux created by blocking winding 9 is in a counterclockwise direction around main aperture 2, and therefore legs 5 and 6 become saturated in an upward direction.

When legs 5 and 6 are saturated in the same direction, e.g., the upward direction, the core is referred to as being in the blocked state, since there is no significant coupling between primary winding 7 and secondary winding 8. Saturation in the upward direction in leg 6 prevents any flow of magnetic flux around coupling aperture 3 in the counterclockwise direction, and saturation in the upward direction in leg 5 prevents the flow of any magnetic flux around the coupling aperture in the clockwise direction.

If transistor 15 is nonconductive, the applied input pulse energizes only set winding 10, and hence only a clockwise flux is induced in the core surrounding main aperture 2. It is an established characteristic of a transfluxor core that the magnetic flux induced surrounding an aperture first saturates the material closest to the aperture and thereafter saturates material at increasingly greater distances from the aperture. The number of turns in set winding 10 and the size of resistor 12 are selected considering the magnitude of the input pulses, so that the magnetic flux induced in the core by winding 10, when energized by an input pulse, saturates all of leg 5, but none of leg 6. Thus, assuming that the core has previously been saturated by the counterclockwise flux from blocking winding 9, the subsequent energization of set winding 10 alone saturates a portion of the magnetic core surrounding main aperture 2 in a clockwise direction. As a result, leg 5 is saturated in the downward direction, and leg 6 remains saturated in the upward direction.

When legs 5 and 6 are saturated in opposite directions, the core is referred to as being in the set state, since primary winding 7 is magnetically coupled to secondary winding 8. In other words, when leg 6 is saturated upwardly and leg 5 is saturated downwardly, there is no resistance to the flow of magnetic flux in a clockwise direction around coupling aperture 3. When magnetic flux flows around coupling aperture 3 in the clockwise direction, legs 5 and 6 are driven out of saturation, thereafter permitting an equal quantity of magnetic flux to flow in the counterclockwise direction. An oscillator 16 is connected to primary winding 7 and applies an alternating signal to the primary winding. A corresponding alternating signal is induced in secondary winding 8 when the core is in the set state.

One end of winding 8 is connected to ground and the other end is connected to the anode of a semiconductor diode 17. The cathode of diode 17 is connected to the base of transistor 15 via a resistor 20. A capacitor 18 and a resistor 19 are each connected in parallel between the cathode of diode 17 and ground. Diode 17 rectifies the alternating signal induced in a secondary winding 8 and therefore a relatively smooth DC potential appears across capacitor 18. This potential maintains the base of transistor 15 positive with respect to the grounded emitter, and therefore renders transistor 15 conductive. It should be noted that capacitor 18 also provides a time delay. In other words, when the transfluxor is initially placed in the set state and an alternating signal is induced in secondary winding 8, a short period of time is required before the potential being built up across capacitor 18 is sufficient to render transistor 15 conductive. Also, when the transfluxor is thereafter placed in the blocked state so that no further alternating signal is induced in secondary winding 8, the potential across capacitor 18 gradually decays, thus maintaining the transistor conductive for a short period of time after the core changes state. The sizes of capacitor 18 and resistor 19 are selected so that the time delay provided is slightly greater than the anticipated time duration of applied input pulses.

An indicating lamp 21 is connected between a positive source of potential and the collector of transistor 15. Thus, lamp 21 becomes energized when transistor 15 becomes conductive, thereby providing a visible indication when the core is in the set state. An output terminal 23 is also connected to the collector of transistor 15 to provide a usable output.

The operation of the binary circuit can be explained by first assuming that transfluxor core 1 is initially in the blocked state and that accordingly there is no significant coupling between primary winding 7 and secondary winding 8. Under these circumstances, transistor 15 is nonconductive. The first applied input pulse therefore energies only set winding 10, which therefore places the transfluxor core in the set state. When the core is in the set state, the alternating signal from oscillator 16 is coupled to secondary winding 8 and, after a short time delay provided by capacitor 18, transistor 15 is rendered conductive. The short time delay permits the applied input pulse to subside before transistor 15 becomes conductive, thus preventing a portion of the first applied input pulse from also passing through blocking winding 9.

Thereafter, transistor 15 is conductive and therefore blocking winding 9 is conditioned for energization. Accordingly, when a second input pulse is applied, blocking winding 9 and set winding 10 are simultaneously energized, but the flux produced by the blocking winding is predominant and therefore places the core in the blocked state. As a result, no further signal is induced in secondary winding 8, and therefore transistor 15 becomes nonconductive. Thus, the second applied input pulse returns the circuit to the initial condition and therefore it can be seen that each successive applied input pulse changes the core to the alternate state.

In installations where the magnitude of the input pulses cannot be controlled conveniently, it may be desirable to utilize an alternate arrangement of transfluxor windings such as shown in copending application Ser. No. 85,763, filed Jan. 30, 1961, by William J. Mahoney and assigned to the assignee of this application. In the copending application, a transfluxor arrangement is illustrated wherein it is not necessary to control the quantity of flux induced by the set winding so that only leg 5 and not leg 6 is affected. Thus, with this alternate type of transfluxor arrangement, the magnitude of the applied input pulses could vary throughout the relatively wide range without substantially affecting the operation of the binary circuit.

While only one embodiment of the invention has been illustrated in detail, it should be obvious to those skilled in the art that there are numerous variations of the circuit within the scope of this invention. The invention is more particularly defined in the appended claims.

What is claimed is:

1. In a binary circuit, the combination of
 a transfluxor core of magnetic material having a stable set state and a stable blocked state;
 a first and a second winding operatively associated with said core,
  said first and second windings being operative to place said core in one of said stable states when energized simultaneously, and
  said second winding being operative to place said core in the other one of said stable states when energized alone;
 switching means connected to said first winding and operatively associated with said core to condition said first winding for energization only when said core is in a selected one of said stable states; and
 circuit means for applying input pulses simultaneously to said first and second windings, thereby energizing both of said windings if said first winding is conditioned and energizing only said second winding if said first winding is not conditioned, whereby said core changes to the alternate one of said stable states upon each successive application of an input pulse.

2. A binary circuit in accordance with claim 1 wherein said first windings is operative to drive said core toward said blocked state when energized;
said second winding is operative to drive said core toward said set state when energized; and
said first winding has a larger number of turns than said second winding, whereby said first winding induces the predominant magnetic flux in said core when both of said windings are energized simultaneously.

3. A binary circuit in accordance with claim 2 wherein said switching device is a transistor operatively connected to become conductive and condition said first winding only when said core is in said set state.

4. In a binary circuit, the combination of
a transfluxor core of magnetic material having a stable set state and a stable blocked state;
a first and a second winding operatively associated with said core,
said first and second windings being operative to place said core in one of said stable states when energized simultaneously, and
said second winding being operative to place said core in the other one of said stable states when energized alone;
a semiconductor device connected to said first winding and operative, when conductive, to condition said first winding for energization;
time delay circuit means operatively interconnected between said core and said semiconductor device to render said semiconductor device conductive shortly after said core is placed in said other state and to maintain said semiconductor device conductive until shortly after said core is returned to said one state; and
circuit means for applying input pulses simultaneously to said first and second windings, thereby energizing both of said windings if said semiconductor device is conductive and energizing only said second winding if said semiconductor device is nonconductive,
whereby said core changes to the alternate one of said stable states upon each successive application of an input pulse.

5. A binary circuit in accordance with claim 4 wherein said first winding is operative to drive said core toward said blocked state when energized;
said second winding is operative to drive said core toward said set state when energized; and said first winding has a larger number of turns than said second winding, whereby said first winding induces the predominant magnetic flux in said core when both of said windings are energized simultaneously.

6. In a binary circuit, the combination of
a transfluxor comprising
a multi-apertured core of magnetic material having a set and a blocked state,
a primary and a secondary winding operatively associated with said core so that the same are inductively coupled when said core is in said set state,
a set winding operatively associated with said core to drive the same toward said set state when energized, and
a blocking winding having a larger number of turns than said set winding and being operatively associated with said core to drive the same toward said blocked state when energized;
a semiconductor device connected to said blocking winding and operative, when conductive, to condition said blocking winding for energization;
means connected for applying an alternating signal to said primary winding;
circuit means connecting said secondary winding to said semiconductor device so that said semiconductor device is maintained conductive by means of energy coupled between said primary and secondary windings while said core is in said set state; and
means for applying input pulses simultaneously to said set and blocking windings so that an applied input pulse
energizes both said set and blocking windings to place said core in said blocked state if said semiconductor device is conductive, and
energizes only said set winding to place said core in said set state if said semiconductor device is nonconductive,
whereby said core changes to the alternate one of said states upon each successive application of an input pulse.

References Cited

UNITED STATES PATENTS

| | | | |
|---|---|---|---|
| 2,990,540 | 6/1961 | Sublette et al. | 340—174 |
| 3,117,308 | 1/1964 | Sublette | 340—174 |
| 3,226,698 | 12/1965 | Mahoney | 340—174 |

BERNARD KONICK, *Primary Examiner.*

R. MORGANSTERN, *Assistant Examiner.*